["United States Patent" [19]]

Kanao

[11] Patent Number: 5,007,462
[45] Date of Patent: Apr. 16, 1991

[54] SYNTHETIC RESIN UNDERGROUND PIPE HAVING HIGH PRESSURE-WITHSTANDING CAPABILITY

[76] Inventor: Shiro Kanao, No. 9-18, Nanpeidai 4-chome, Takatsuki-shi, Osaka, Japan

[21] Appl. No.: 520,990

[22] Filed: May 9, 1990

Related U.S. Application Data

[63] Continuation of Ser. No. 227,413, Jun. 29, 1988, abandoned, which is a continuation of Ser. No. 127,543, Dec. 1, 1987, abandoned, which is a continuation of Ser. No. 831,893, Feb. 24, 1986, abandoned.

[30] Foreign Application Priority Data

| Feb. 25, 1985 [JP] | Japan | 60-26173[U] |
| Aug. 9, 1985 [JP] | Japan | 60-23193 |
| Aug. 9, 1985 [JP] | Japan | 60-123191[U] |
| Aug. 9, 1985 [JP] | Japan | 60-123192 |
| Dec. 12, 1985 [JP] | Japan | 60-191581[U] |

[51] Int. Cl.⁵ ............................................. F16L 11/11
[52] U.S. Cl. ..................................... 138/154; 138/105; 138/122; 138/153; 138/173; 138/174
[58] Field of Search ............... 138/105, 121, 122, 133, 138/134, 153, 154, 135, 138, 172, 173, 174

[56] References Cited

U.S. PATENT DOCUMENTS

| 1,797,193 | 3/1931 | Kimmich | 138/133 |
| 2,448,485 | 8/1948 | Chernack | 138/133 |
| 2,688,343 | 9/1954 | Cuddeback | 138/133 |
| 3,198,873 | 8/1965 | Ryan et al. | 138/133 |
| 3,671,348 | 6/1972 | Kemsey-Bourne | 156/195 |
| 3,679,531 | 7/1972 | Wienand et al. | 138/154 |
| 3,890,181 | 6/1975 | Stent et al. | 138/172 |
| 4,172,473 | 10/1979 | Lefere et al. | 138/174 |
| 4,172,474 | 10/1979 | Stahl | 138/122 |
| 4,368,088 | 1/1983 | Asakura et al. | 138/122 |
| 4,487,232 | 12/1984 | Komao | 138/154 |
| 4,510,004 | 4/1985 | Hawerkamp | 156/143 |
| 4,624,603 | 11/1986 | Kanao | 138/154 |
| 4,628,966 | 12/1986 | Kanao | 138/122 |
| 4,759,389 | 7/1988 | Suek | 138/154 |

FOREIGN PATENT DOCUMENTS

| 2141281 | 3/1973 | Fed. Rep. of Germany | 138/133 |
| 2138544 | 1/1973 | France | 138/174 |
| 2730 | of 1894 | United Kingdom | 138/175 |
| 473535 | 10/1937 | United Kingdom | 138/135 |
| 736059 | 8/1955 | United Kingdom | 138/172 |
| 991542 | 5/1965 | United Kingdom | 138/132 |

Primary Examiner—James E. Bryant, III
Attorney, Agent, or Firm—Sughrue, Mion, Zinn Macpeak & Seas

[57] ABSTRACT

A synthetic resin pipe intended for underground use having an increased strength but reduced wall thickness. In accordance with the invention, a reinforcing member, in the form of a perforated belt, is embedded in or fused to the resin material of the pipe and extends along top portions and at least portions of the side walls adjacent to the top portions of the corrugations of the pipe.

7 Claims, 11 Drawing Sheets

SYNTHETIC RESIN UNDERGROUND PIPE HAVING HIGH PRESSURE-WITHSTANDING CAPABILITY

This is a continuation of Ser. No. 227,413, filed Jul. 29, 1988, now abandoned, which is a continuation of application Ser. No. 127,543, filed Dec. 1,1987, now abandoned, which is a continuation of application Ser. No. 831,893, filed Feb. 24, 1986, now abandoned.

BACKGROUND OF THE INVENTION

The present invention relates to a pipe made of synthetic resin and intended for underground use where a high pressure must be withstood. Such pipes are typically used for water mains pipes, sewer pipes, drain pipes, electric and telephone cable conduits, and the like.

Pipes intended for such underground use must, in addition to a high pressure-withstanding strength, be light in weight so that they can be easily handled in constructing underground pipelines.

Conventionally, concrete pipes and cast-iron pipes have been used for the purposes described above. These conventional pipes, however, are very heavy, and hence it is quite difficult to handle them in constructing underground pipelines.

Recently, underground pipes made of a synthetic resin material and having a helically configured wall have become available. These pipes are easy to handle because of their light weight. Specifically, because these pipes are light in weight, the individual pipe segments can be made longer than in the case of employing concrete pipes or cast-iron pipes. Also, curving or bending of such pipes during installation can readily be accomplished because of their inherent flexibility. Accordingly, such pipes have lately come into widespread use.

A cross-sectional view through a portion of the wall of one of these pipes is illustrated in FIG. 1. As shown in this drawing, the wall 01 of the pipe has a helical reinforcing corrugation (reinforcing rib) formed on its outside. To increase the pressure-withstanding strength of such a pipe, it has been the practice to merely increase the thickness of the wall 01. However, this approach to increasing the pressure-withstanding strength of the pipe results in a more costly pipe since a larger amount of synthetic resin material must be used in its manufacture. Also, the flexibility of the pipe, which is one of the outstanding features of a synthetic resin pipe, becomes less.

SUMMARY OF THE INVENTION

Accordingly, it is an object of the present invention to provide a synthetic resin pipe for underground use in which the above-mentioned problems have been eliminated.

Specifically, it is an object of the present invention to provide a synthetic resin underground pipe in which the pressure-withstanding strength is increased without increasing the amount of synthetic resin material needed in the manufacture in the pipe, thereby resulting in a pipe of reduced weight and increased strength.

In accordance with these and other objects of the invention, the invention provides a synthetic resin underground pipe having formed on its outside wall a helical corrugation in which, in accordance with the invention, a thin metal plate extends across the entire top portion of each of the corrugations and along at least a part of the opposite side walls connected to the top portion. This reinforcing member is either fused to or embedded in the resin material forming the corrugation. It has been found that, even if the reinforcing member is made of an extremely thin metal plate, a sufficient reinforcing effect is obtained to make it possible to significantly reduce the overall weight of the pipe without reducing its flexibility and good bending properties. Accordingly, the cost of the pipe is reduced, and the labor needed in its installation is also less than when conventional pipes are used.

BRIEF DESCRIPTION OF THE DRAWINGS

FIGS. 8 and 9 are exploded explanatory views of FIGS. 6 and 8, respectively;

DESCRIPTION OF THE PREFERRED EMBODIMENTS

The invention will be described now with reference to preferred embodiments shown in the accompanying drawings.

Figure 1:
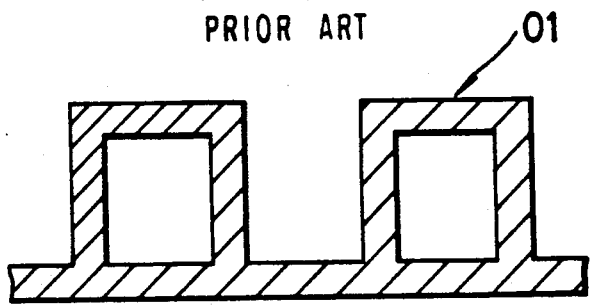
FIG. 1 is a longitudinal cross-sectional view of a portion of a wall of a conventional synthetic resin pipe of the same general type to which the invention pertains.
Figure 2:
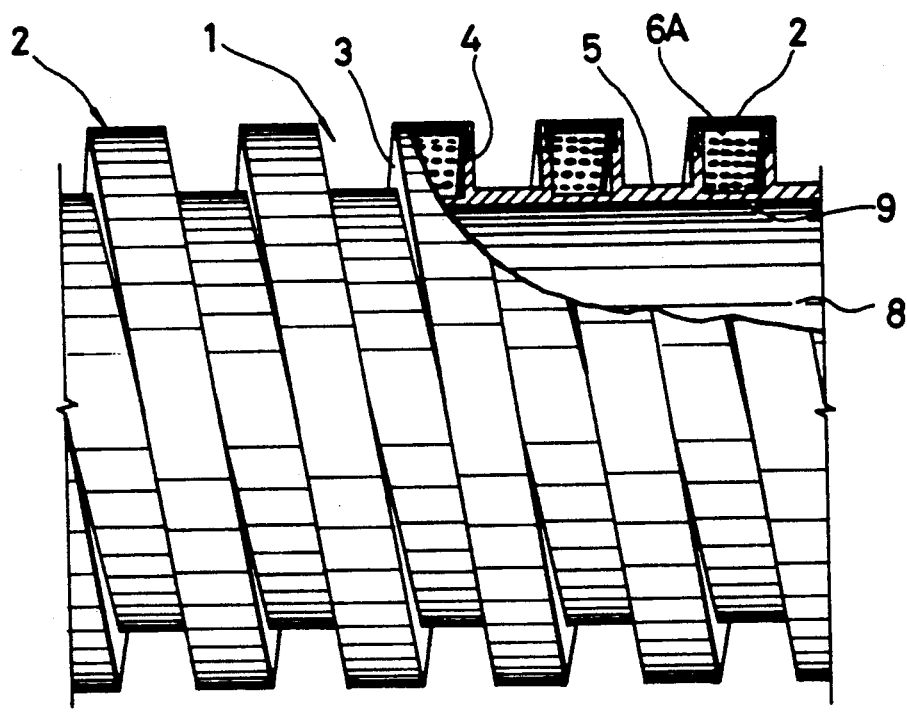
FIG. 2 shows a side view, with a portion cut away, of a synthetic resin pipe constructed in accordance with a first embodiment of the invention.
Figure 3:
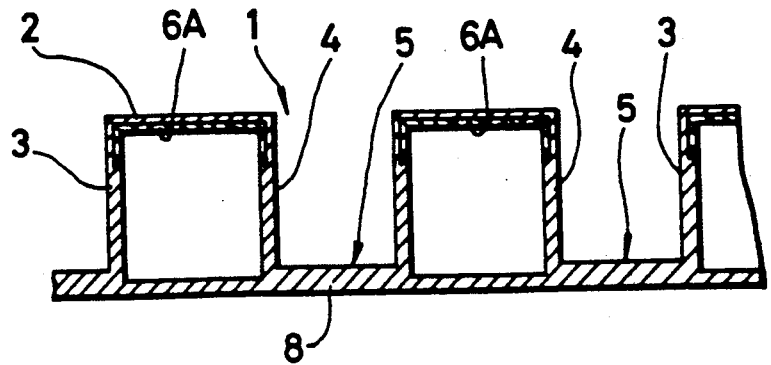
FIG. 3 is a longitudinal cross-sectional view of a portion of the wall of the pipe of FIG. 2.
Figure 4:
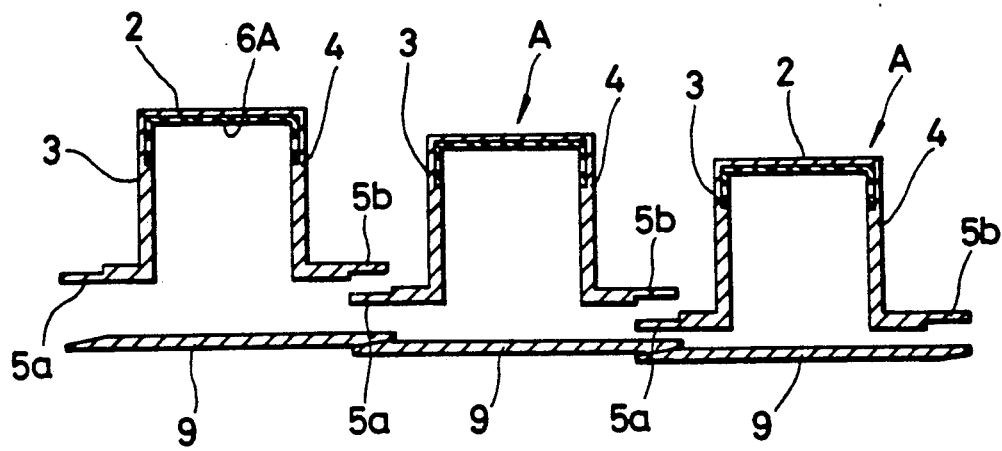
FIG. 4 is an exploded explanatory view of the pipe portion shown in FIG. 3.
Figure 5:
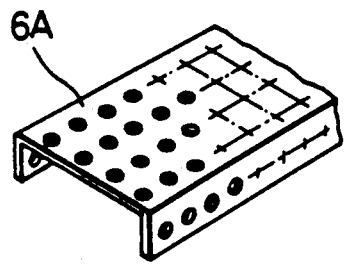
FIG. 5 is a perspective view showing a reinforcing belt plate which is used in the pipe of the embodiment of FIG. 2.

FIGS. 2 to 4 illustrate a first embodiment of a synthetic resin pipe constructed in accordance with the invention. With reference first to FIG. 2, to form the inner wall of the pipe, a belt 9 formed of a synthetic resin is wound helically to form a cylindrical inner wall 8 of the pipe. Edge portions of the belt 9 are made to overlap as shown in the exploded view of FIG. 4. A corrugated belt body A is then wound on the outer peripheral surface of the inner wall 8, also as illustrated in FIG. 4. A generally U-shaped reinforcing corrugation A is then wound on the outer surface of the wall 8 thus formed. At the top portion of the reinforcing corrugation A is joined by fusion a reinforcing member in the form of belt plate 6A having a configuration as shown in FIG. 5. As illustrated in FIG. 5, the reinforcing belt plate 6A is made of a stainless-steel perforated belt bent along the edges so that the reinforcing belt plate 6A extends across the entire top portion of the corrugation A and partially down the adjacent sidewalls 3 and 4 thereof. The perforations in the reinforcing belt plate 6A allow resin to flow therethrough during fabrication so as to tightly fuse the belt plate 6A to the resin material. The free ends 5a and 5b of the corrugation A are wound in an overlapping fashion as illustrated in FIG. 4. The overlapping free ends 5a and 5b and the adjacent overlapping portions of the resin belt 9 are fused together to form an integral pipe.

Figure 6:
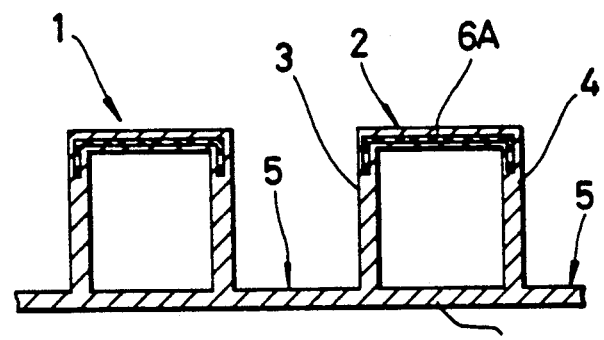
FIGS. 6, 8 and 10 are longitudinal cross-sectional views showing portions of walls of pipes of other embodiments of the invention.

A modification of the pipe of FIG. 2 is illustrated in FIG. 6, wherein the reinforcing belt plate 6A is entirely embedded within the resin material at the top portion of the corrugation B. Also, the resin of the belt 9 is formed with a slightly projecting portion 9a received within the corrugation B.

It is not always necessary, however, to provide the second portion 9A, and an outer pipe wall 9 of uniform thickness can be employed as in the first embodiment.

Further, it is possible to use other configurations for the inner wall 9 of the pipe. For instance, an inner wall 9 having a wavy shape in cross-section may be used in some instances. It is preferred, however, if the pipe is to be used as a water mains pipe or sewer pipe that the inner surface of the inner wall 9 be smooth.

Still further, although the first two embodiments have been described with reference to cases where the corrugation A or B is generally rectangular in cross-section, embodiments are contemplated in which the cross-sectional shape of the corrugation is arcuate. Such pipes, which are particularly suitable as protective conduits for electrical or telephone cables or the like, will be illustrated in the following third embodiment.

Figure 8:
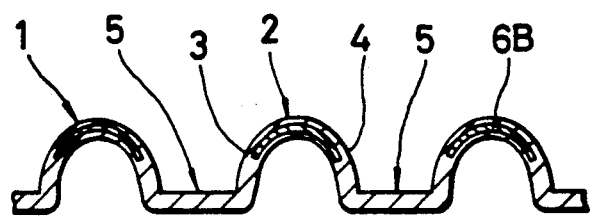
Figure 9:
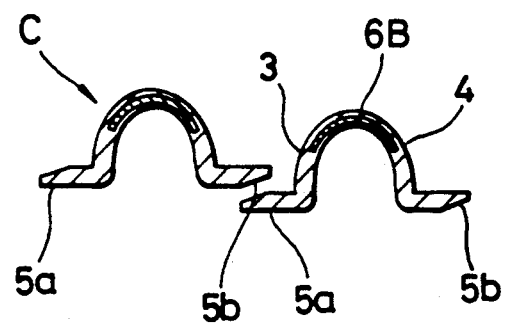

With reference now to FIGS. 8 and 9, in the synthetic resin pipe of the third embodiment of the invention, a reinforcing belt plate 6B having a semicircular, arcuate cross-section is embedded inside a correspondingly shaped corrugation C. To form the pipe, the corrugation C is wound in a helix so that the edge portions 5a and 5b of adjacent windings overlap. The overlapping edge portions are then fused together In this embodiment, it is not necessary to provide an inner wall 8 as in the first two embodiments. That is, the corrugation itself forms the wall of the pipe.

The pipe of the third embodiment is advantageous in that the electric wires or the like are supported only on the inner circumferential surfaces of the trough portions 5 of the wall of the pipe so that, due to the reduced frictional area between the inner surface of the pipe and the electrical wires or the like, only a relatively small force is required for insertion through the wires of the pipe. Also, any dew which forms in the interior of the pipe will be collected in the downward-facing trough portions away from the wires.

Figure 10:
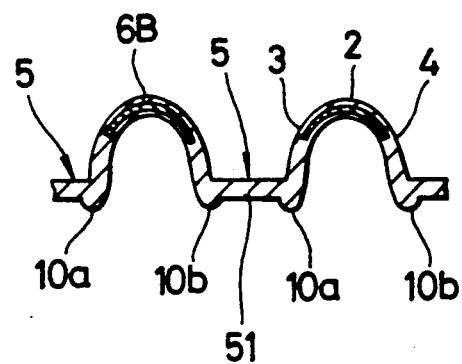

With reference now to FIG. 10, in a fourth embodiment of the invention, projecting ridge portions 10a and 10b are provided on the inner circumferential surface of the pipe at the ends of the walls 3 and 4. It is also possible to form the projecting ridge portions at positions intermediate the trough portions 5 (at a location indicated by reference numeral 51 in FIG. 10). In the pipe of this fourth embodiment, the amount of friction between the wires and the inner surface of the pipe is even further reduced.

Next, a description will be given of various forms and modifications of the reinforcing belt plate 6.

Figure 7:
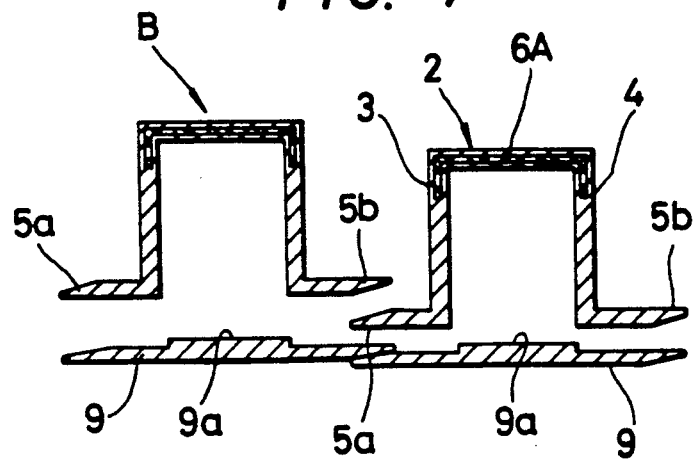
Figure 11:
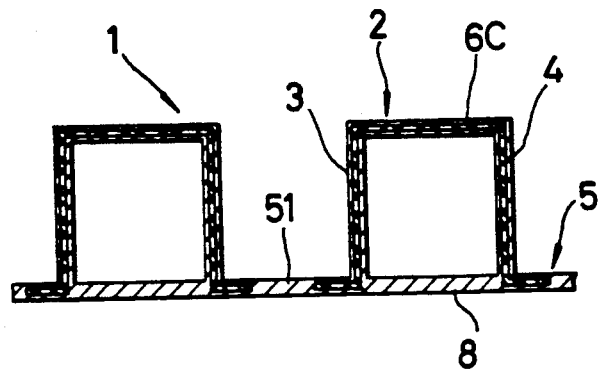
FIGS. 11, 14, 16, 19-21, 24, 26, 28 and 31 are longitudinal cross-sectional views showing portions of walls of still further embodiments of the invention.
Figure 12:
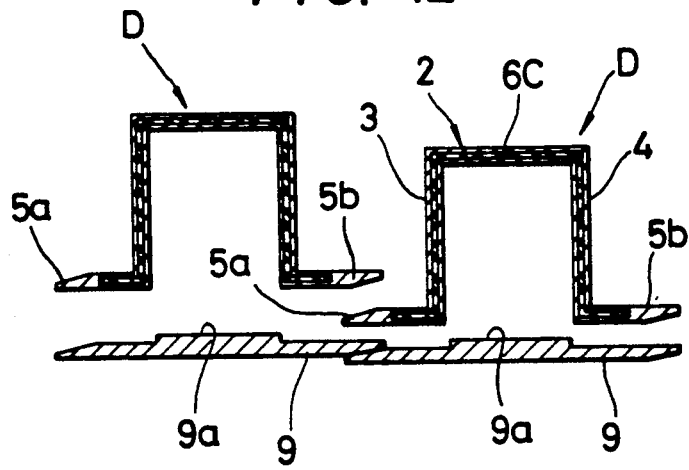
FIGS. 12, 15, 17, 22, 25, 27, 29 and 32 are exploded explanatory views of FIGS. 11, 14, 16, 21, 24, 26, 28 and 31, respectively.
Figure 13:
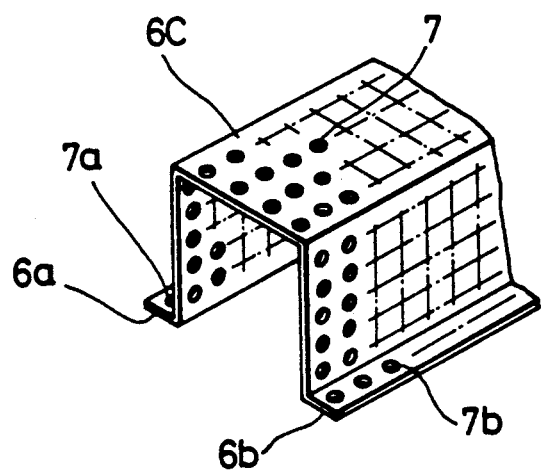
FIGS. 13, 18, 23 and 30 are perspective views showing other types of reinforcing belt plates which may be used with the invention.

With reference to FIGS. 11 and 12, a fifth embodiment will be described. In this embodiment, the flat belt body 9 has a thicker portion 9a, similar to the embodiment of FIG. 7. Further, in this embodiment, a reinforcing metal belt plate 6C is embedded in the walls defining the reinforcing corrugation D, the belt plate 6C having portions which extend along the length of the opposite side walls 3 and 4 and into the outwardly projecting edges of the corrugation. The edge portions 5a and 5b, which overlap, project laterally outwardly beyond the lateral edges of the reinforcing belt plate 6C. As before, it is not necessary to provide the thicker portions 9a.

Figure 14:
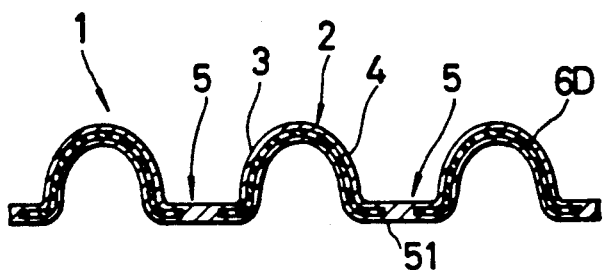
Figure 15:
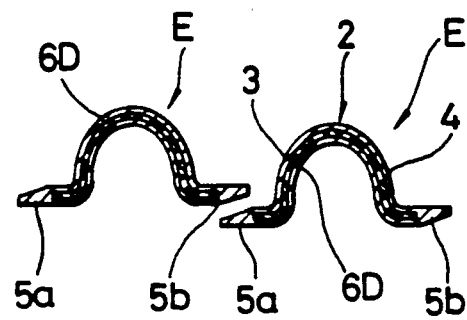

With reference now to FIGS. 14 and 15, a sixth embodiment of the invention will be described. In the sixth embodiment, the walls of the pipes are constructed in substantially the same manner as in the embodiment depicted in FIG. 8. However, in this case, the reinforcing belt plate 6D is generally U-shaped defining a bight, legs, and free ends and extends over the entire length of the arcuate reinforcing ribs and into a part of the trough portions 5. In this case, the belt body E is entirely embedded within the resin material.

Figure 16:
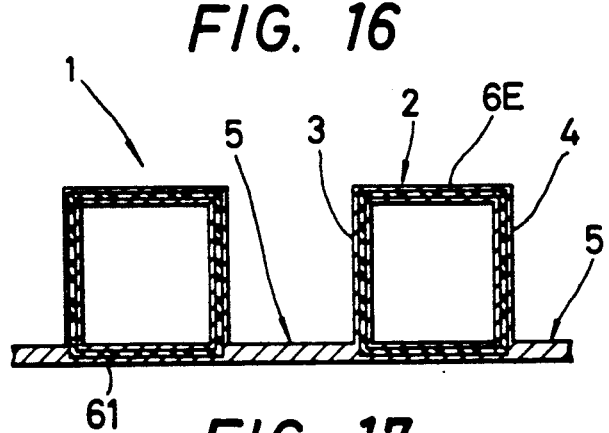
Figure 17:
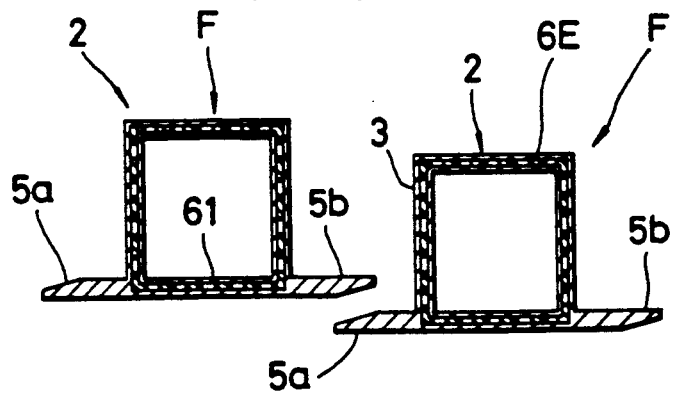
Figure 18:
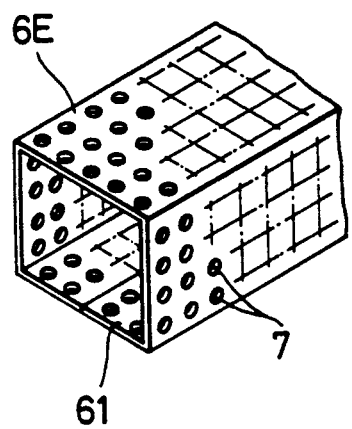

In the seventh embodiment depicted in FIGS. 16 and 17, the reinforcement is generally rectangular in cross section. As seen in FIG. 18, the reinforcing member 6E in this case takes the form of a metal perforated member having a generally square cross section. To construct the pipe, the reinforcement 6E is embedded entirely in resin, the resin flowing through perforation 7 formed therein The bottom portion 61 of the reinforcement 6E (where a seam is located) is disposed towards the inside of the pipe. Belts, as depicted in FIG. 17, are wound with overlapping edge portions 5a and 5b fused together to form a pipe structure as depicted in FIG. 16.

Figure 19:
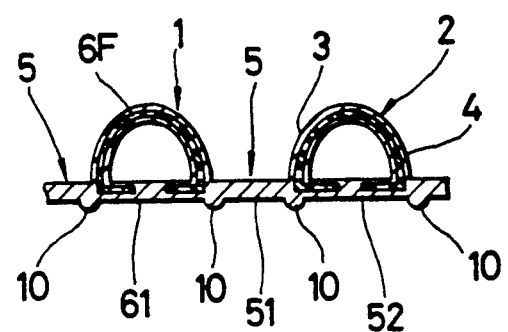

In the eighth embodiment illustrated in FIG. 19, reinforcing member 6F having a generally arcuate cross section but closed at the bottom portions 61 are employed. In this case, the reinforcing members 6F extend throughout the corrugations and are bent inwardly at the junctions between the corrugations and the straight walls of the pipe leaving a gap between their ends. Projecting portions 10 may be provided at positions corresponding to the ends of the walls 3 and 4. The projections 10 may also be formed at portions indicated by reference numeral 51.

Figure 20:
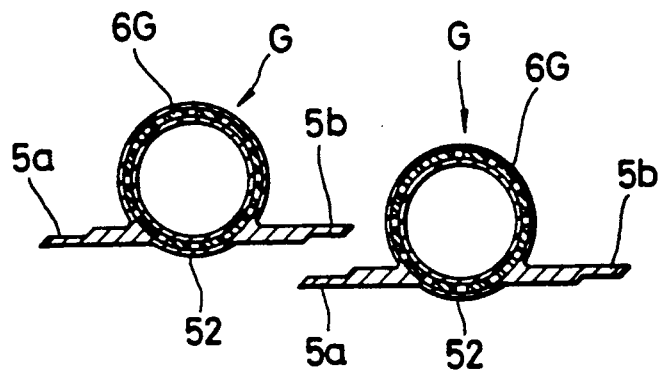

With reference to FIG. 20, in a ninth embodiment, the reinforcement takes the form of a cylindrical reinforcing member 6G, thereby forming corrugations G having a generally circular cross section. The reinforcing member 6G is entirely embedded within the resin material. Trough portions 5 containing no reinforcing member extend between the corrugations G. As illustrated in FIG. 20, the reinforcements projects somewhat into the interior of the pipe, but it is possible to employ a construction wherein the inner surfaces of the pipe are straight.

Figure 21:
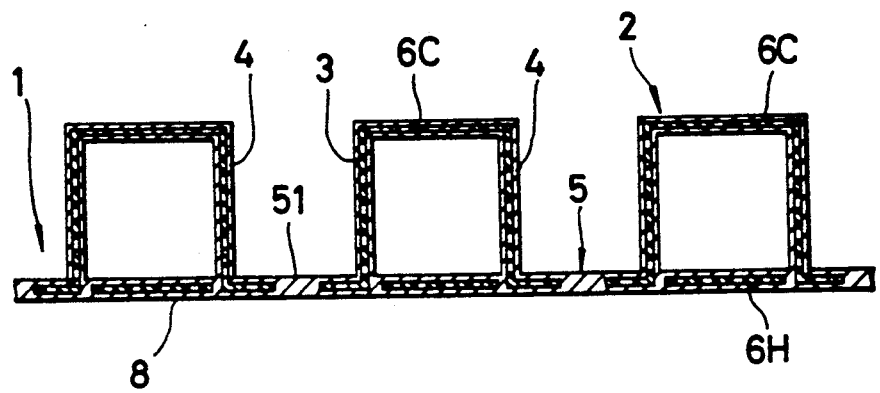
Figure 22:
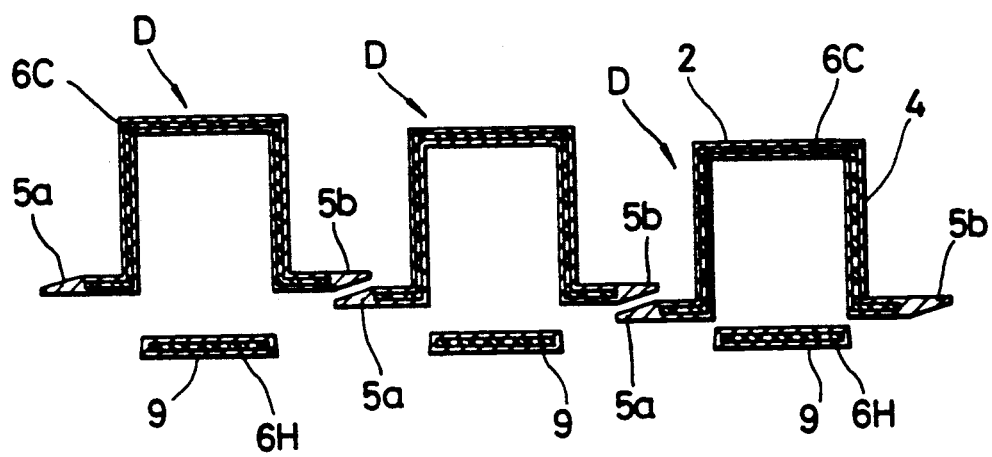
Figure 23:
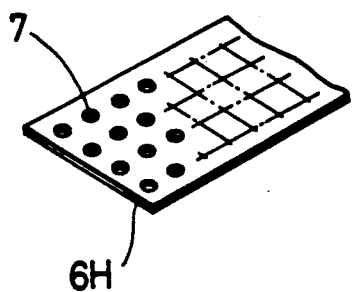

In the tenth embodiment illustrated in FIGS. 21 to 23, the corrugations D of the pipe again have a generally square cross section. To form the pipe, a reinforcing member 6C, having a shape as indicated in FIG. 22 wherein it covers the entire top portion and sides of the corrugations D and extends into a portion of the outwardly extending parts, is wound in a helical fashion. A flat belt body 9 is successively helically wound so as to close the inner portions of the corrugations D. The flat belt body 9 includes a flat reinforcing belt 6H, as illustrated in FIG. 23, entirely embedded in resin. In this manner, small gaps are formed between the edges of the reinforcing member 6H and the adjacent portions of the reinforcing member 6C.

Figure 24:
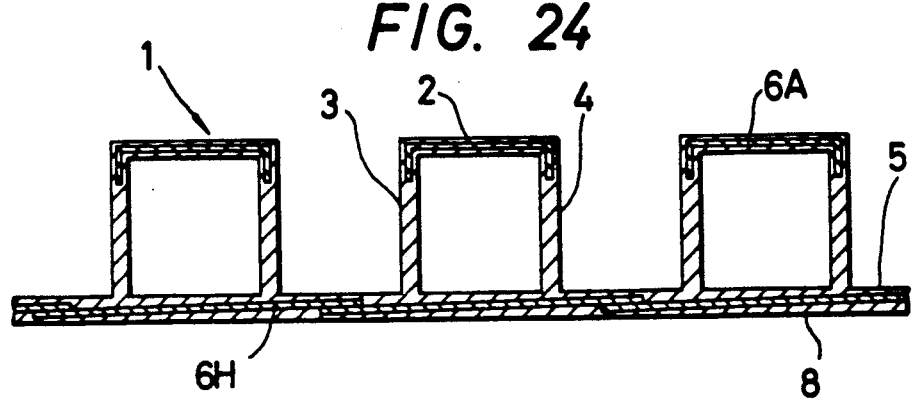
Figure 25:
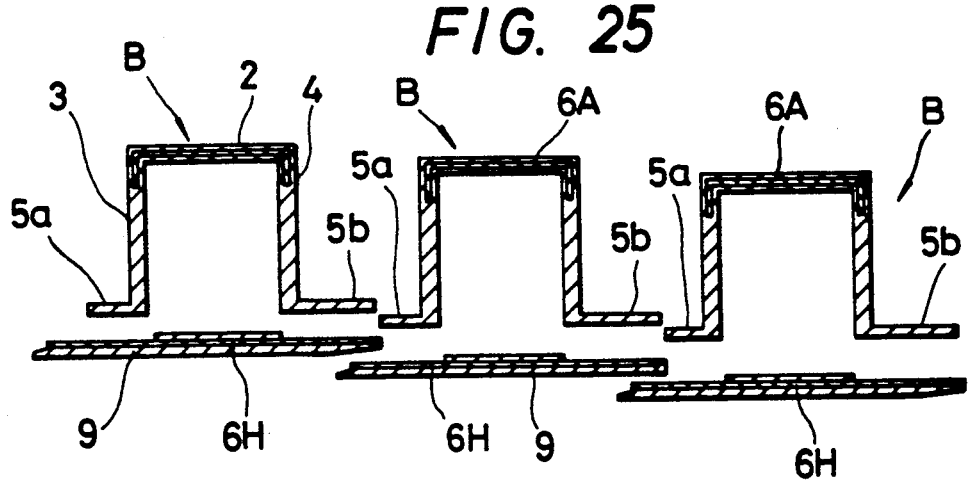

In the eleventh embodiment illustrated in FIGS. 24 and 25, a reinforcing belt plates 6A is employed, similar to the first embodiment of FIG. 2. The inner wall 8 of the pipe is formed from a resin belt body 9, on the outer surface of which a flat reinforcing belt plate 6H is fused. Portions of synthetic resin material may be provided over the central part of the reinforcing belt plate 6H. The width of the reinforcing belt plate 6H is such that its edge portions overlap when the belt body 9 is wound into a cylindrical form as illustrated in FIG. 25. The projecting edge portions 5a and 5b are aligned with the overlapping portions of the belt plate 6H. The reinforcing belt plate 6H is entirely embedded within the resin and has no holes formed therein. The reinforcing belt plate 6H also has no holes formed therein.

Figure 26:
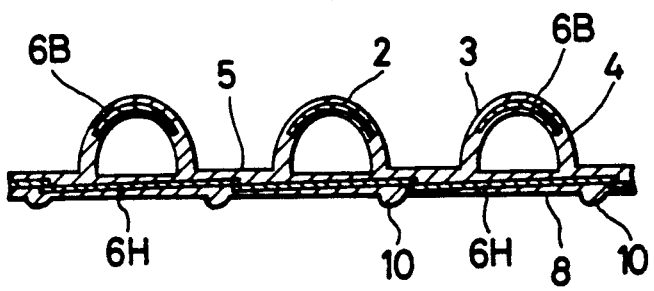
Figure 27:
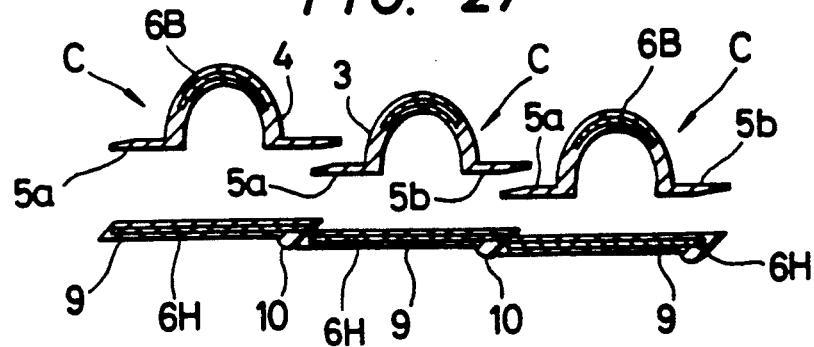

Referring now to FIGS. 26 and 27, in the twelfth embodiment, the outer wall of the pipe is formed in the same fashion as in the embodiment of FIGS. 8 and 9. Further, an inner wall 8 is provided by winding a belt body 9 in which is embedded a flat reinforcing belt plate 6H in a helical fashion with the edges of the belt plate 6H aligned with the overlapping edges 5a and 5b of the corrugations C. Further, second projecting ridge portions 10 may be provided opposite the overlapping edges 5a and 5b which project towards the interior of the pipe.

Figure 28:
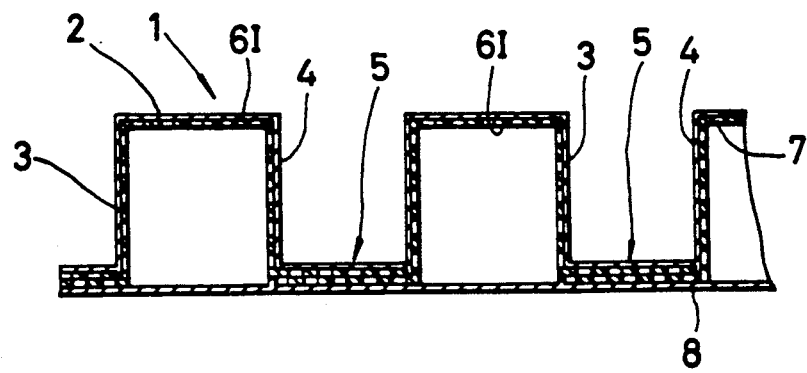
Figure 29:
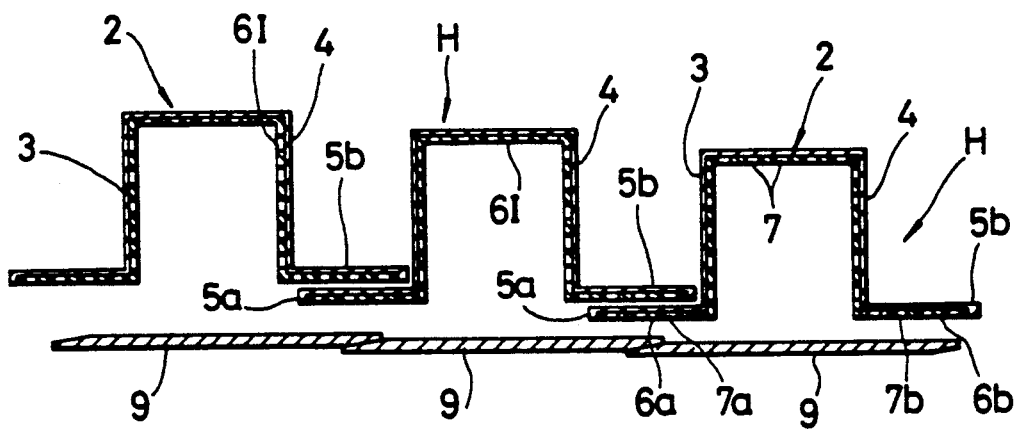
Figure 30:
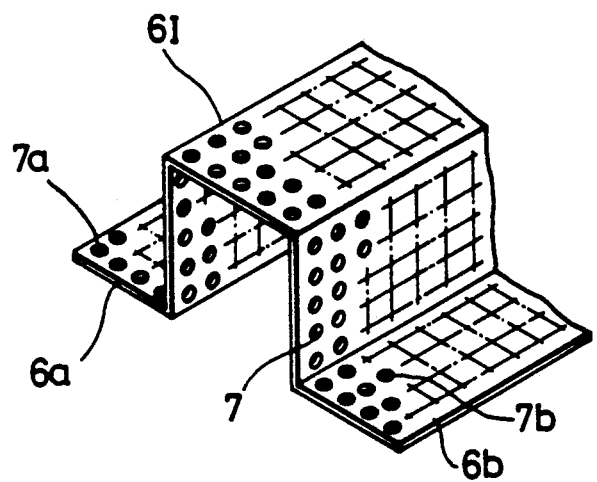

In the thirteenth embodiment illustrated in FIGS. 28 and 29, a structure similar to that of the embodiment of FIGS. 3 and 4 is employed. However, in this case the reinforcing member 6I extends beyond the edges of the walls 3 and 4 so as to create overlapping portions 6a and 6b in the trough portions 5. The reinforcing member 6I is fused to the inner surface of the resin material which forms the corrugation H. The metal reinforcing member in this case is perforated. Of course, it is possible to entirely embed the reinforcing member 6I in the resin material.

Figure 31:
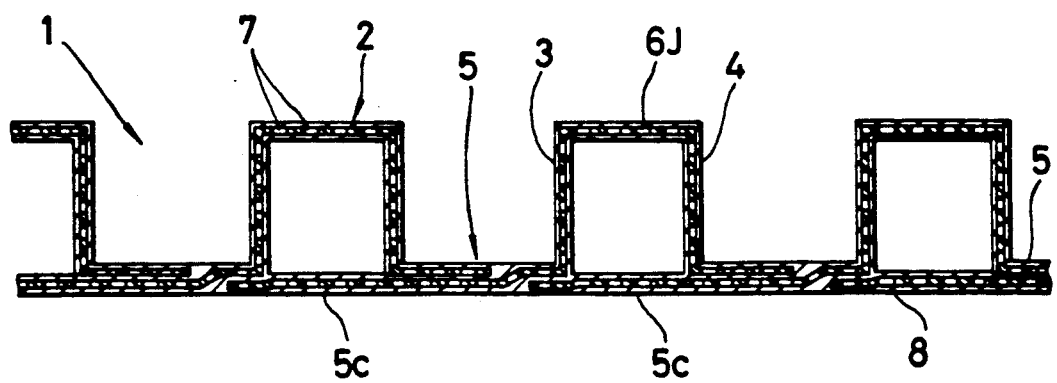
Figure 32:
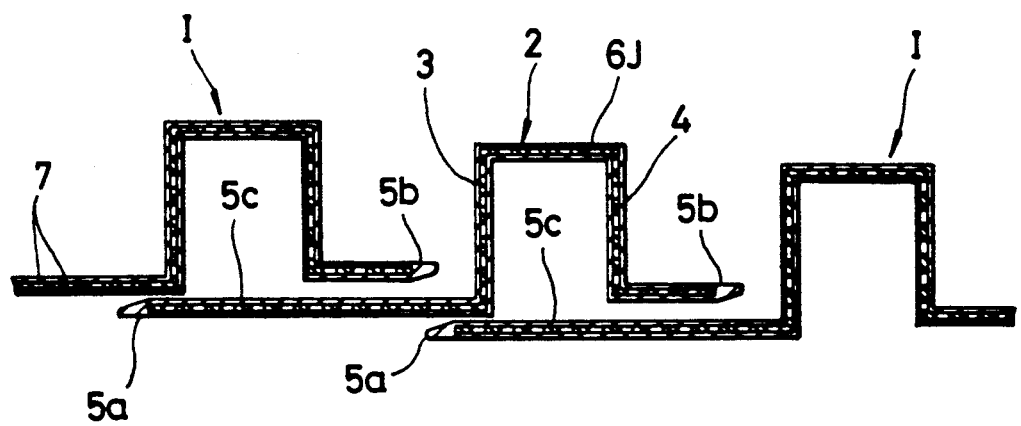

In the fourteenth embodiment illustrated in FIGS. 31 and 32, the belt which is helically wound to form the walls of the pipe contains generally rectangularly shaped corrugations I. The projecting edge portion 5c of one side of the belt body is longer than that of the other side, with the longer projecting edge portion 5c being of sufficient length to close the adjacent corrugation I. A reinforcing member 6J is embedded in the resin material and extends throughout the belt except at the tips 5a and 5b of the belt.

Figure 33:
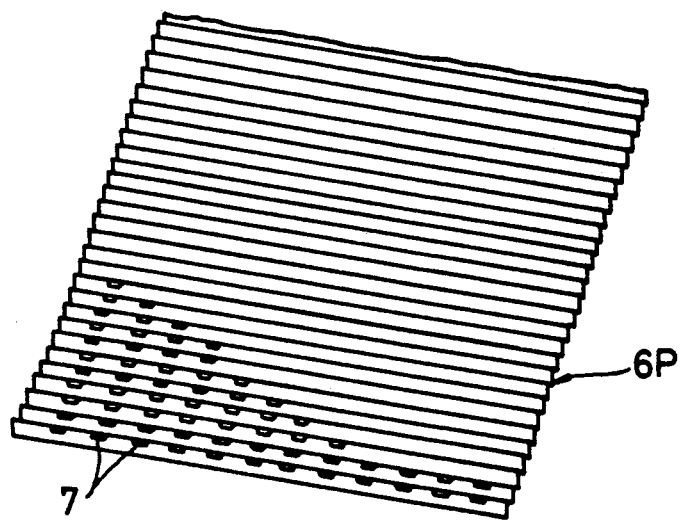
FIG. 33 is a perspective view showing a reinforcing belt material which can be used in the invention.
Figure 34:
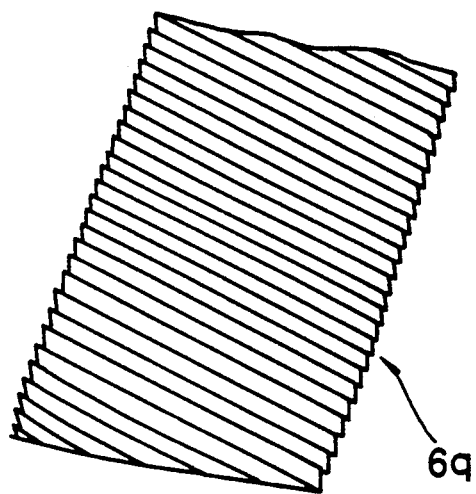
FIG. 34 is a perspective view showing another type of reinforcing belt material which can be used with the invention.
Figure 35:
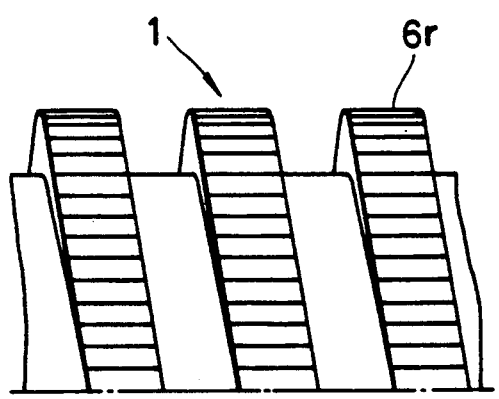
FIG. 35 is an external front view of a portion of a pipe of the invention employing the reinforcing belt material shown in FIG. 34.

FIG. 33 shows a perspective view of an alternate type of material which may be used to form the various reinforcing members of any of the above-discussed embodiments. In this case, the reinforcing member is formed of a sheet 6P containing corrugations running in the direction perpendicular to the longitudinal direction of the belts into which the reinforcing material is formed Perforations 7 are formed therein of an arbitrary size. As shown in FIGS. 34 and 35, the sheets 6q may contain corrugations extending obliquely with respect to the longitudinal direction of the belts. In either case, an increased strength is attained.

As to the material of the reinforcing member, stainless steel plate is preferred, but other materials, such as ordinary steel, may be used as well. As already described, the blank sheet from which the reinforcing members are formed may be flat, have punched holes or not, and may itself contain corrugations. The shape, size and density of the holes, if they are provided, are a matter of design choice, and the invention is not restricted to any particular values.

As to the synthetic resin material forming the pipe walls, an olefin such as polyethylene, polypropylene, or the like may be used. Otherwise, a vinyl chloride may be used, as well as other synthetic resin materials.

To demonstrate the advantageous effects of the invention, a pipe constructed as shown in FIGS. 21 and 22 (pipe A) was compared with a conventional pipe (pipe B). Pipe A had an overall wall thickness of 1 mm, and the thickness of the reinforcing members 6C and 6H were 0.5 mm, that is, resin to a thickness of 0.25 mm was present on both sides of the reinforcing members. The material of the resin was a hard polyvinyl chloride material having a Young's modulus (E) of 250 kg/mm². The comparison pipe B had a wall thickness of 4 mm (no reinforcing member), and was made of the same resin material.

The flattening load and the flattening amount for these two pipes were calculated as follows:

$$\text{Flattening load } W = \frac{E \cdot I \cdot \Delta Y}{0.1488 R^3}$$

$$\text{Flattening quantity } Y = 0.1488 \frac{WR^3}{EI}$$

(where W = flattening load, E = Young's modulus, I = cross-sectional secondary moment (which depends upon the thickness, shape, etc.), and R = neutral axis radius.

Substituting the appropriate numerical values for pipes A and B into the above equations, the following results are obtained:

$$W(\text{pipe } A) \simeq \frac{(20,000 \cdot 0.5I' + 250 \cdot 0.5I')\Delta Y}{0.1488 R^3}$$

$$\simeq \frac{10,125 I' \cdot \Delta Y}{0.1488 R^3}$$

$$W(\text{pipe } B) \simeq \frac{250 \cdot 4.0 I' \cdot \Delta Y}{0.1488 R^3}$$

$$\simeq \frac{1000 I' \cdot \Delta Y}{0.1488 R^3},$$

where I' represents the remainder components of the cross-sectional secondary moment I.

The flattening amount $\Delta Y$ can be expressed as follows:

$$\Delta Y(\text{pipe } A) \simeq 0.1488 \frac{WR^3}{20,000 \cdot 0.5 I' + 250 \cdot 0.5 I'}$$

$$\simeq 0.1488 \frac{WR^3}{10,125 I'}$$

$$\Delta Y(\text{pipe } B) \simeq 0.1488 \frac{WR^3}{250 \cdot 4 I'}$$

$$\simeq 0.1488 \frac{WR^3}{1000 I'}$$

Since 10,125:1000 = 10.125:1, it is demonstrated that pipe A of the invention has a pressure-withstanding flattening strength about ten times that of the conventional pipe B. This is true in spite of the fact that the inventive pipe A has a thickness only about one-quarter than of the comparison pipe.

The specific gravity of iron and polyvinyl chloride resin are, respectively, 7.86 and 1.406. Taking into account the relative thicknesses of the resin and metal portions of pipes A and B, the relative weights thereof can be calculated as follows:

Relative Weight (pipe A)=7.86·0.5+1.406·0.5=4.633

Relative Weight (pipe B)=1.406·4.0=5.624 and hence the weight ratio between the pipe A of the invention and the conventional pipe B is 4.633:5.624=1:1.214. In other words, the pipe of the invention is about 20% lighter (on a unit length basis) than the conventional pipe. Also, since the thickness of the resin employed with the pipe of the invention is 0.5 mm and the conventional pipe 4.0 mm, the inventive pipe requires only about one-eighth of the amount of resin material as the conventional pipe.

Among the above-described embodiments, the pipes of the first to the fourth embodiments and those of the seventh to the ninth embodiments employ a trough portion 5 formed only with resin material. These embodiments are thus expected to provide great flexibility due to the existence of this trough portion. Furthermore, the pipes of the fifth, sixth and tenth embodiments are constructed such that a middle portion 51 containing only synthetic resin material is formed in each of the trough portions 5, and hence these pipes can be expected to have good flexibility as well. Therefore, these pipes can more easily handled and installed than a corresponding conventional pipe having a greater wall thickness.

In the pipes of the eleventh to the fourteenth embodiments, the reinforcing member extends along the trough portions as well. These embodiments are superior in hardness and can withstand extremely high pressures. Pipe sections having such a construction are used to advantage for straight pipe runs.

This completes the description of the preferred embodiments of the invention. Although preferred embodiments have been described, it is believed that numerous modifications and alterations thereto would be apparent to one having an ordinary skill in the art without departing from the spirit and scope of the invention.

What is claimed is:

1. A synthetic resin pipe for underground use, comprising;

an integral, pipe wall corrugation helically wound to form a pipe, said corrugation having an outwardly projecting portion and flange portions on opposing sides of said projecting portion, adjacent flange portions being connected together to form a pipe having a helical trough portion adjacent said projecting portion; and a thin metal plate reinforcing member disposed within said outwardly projecting portion of said helically disposed corrugation, said reinforcing member being made of one of steel and iron so as to increase both the internal and external pressure withstanding capabilities of said pipe, wherein said metal plate is embedded within synthetic resin such that the synthetic resin ; completely surrounds and covers the complete surface of said thin metal plate reinforcing member to prevent water condensation thereon and rusting thereof during underground use of said pipe, wherein said reinforcing member is generally U-shaped defining a bight, legs and free ends, and the legs open toward the interior of said pipe and said free ends project laterally in a longitudinal direction of said pipe into a portion of each of said flanged portions so as to be partially disposed within said trough portion along the entire length of said pipe.

2. The synthetic resin pipe of claim 1, wherein said reinforcing member is made of a thin metal, continuous metal plate.

3. The synthetic resin pipe of claim 1, wherein said reinforcing member is made of a metal plate having inner and outer sides having a plurality of small holes formed throughout facilitating the embedding of the metal plate reinforcing member completely within synthetic resin on both sides of the metal plate to prevent water condensation thereon and rusting thereof during underground use of said pipe.

4. The synthetic resin pipe of claim 1, wherein said resin is selected from the group consisting of olefin and vinyl chloride resins.

5. The synthetic resin pipe of claim 1, wherein said reinforcing member is fused to said resin through small holes formed throughout said reinforcing member.

6. The synthetic resin pipe of claim 1, wherein the bight of said corrugation has an arcuate cross section.

7. The synthetic resin pipe of claim 1, further comprising an inner wall disposed at the interior of said pipe, said inner wall having a substantially constant diameter.

* * * * *

UNITED STATES PATENT AND TRADEMARK OFFICE
CERTIFICATE OF CORRECTION

PATENT NO. : 5,007,462

DATED : April 16, 1991

INVENTOR(S) : Shiro Kanao

It is certified that error appears in the above-identified patent and that said Letters Patent is hereby corrected as shown below:

On the cover sheet: Item

"[30] Foreign Application Priority Data", please make the following changes:

Change "Aug. 9, 1985 [JP] Japan .....60-23193" to --Aug 9, 1985 [JP] Japan ....60-123193[U]--;

Change "Aug. 9, 1985 [JP] Japan ..... 60-123192" to --Aug. 9, 1985 [JP] Japan .... 60-123192[U]--.

Signed and Sealed this

Sixteenth Day of November, 1993

Attest:

BRUCE LEHMAN

Attesting Officer    Commissioner of Patents and Trademarks